US 8,167,585 B2

(12) United States Patent
Kreitzer et al.

(10) Patent No.: US 8,167,585 B2
(45) Date of Patent: May 1, 2012

(54) DEVICES AND/OR SYSTEMS FOR MOUNTING AN AUXILIARY BLOWER

(75) Inventors: Scott Kreitzer, Maineville, OH (US); Patric Willems, Nurenberg (DE); Ekkehard Ressel, Hellsbronn (DE)

(73) Assignee: Siemens Industry, Inc., Alpharetta, GA (US)

( * ) Notice: Subject to any disclaimer, the term of this patent is extended or adjusted under 35 U.S.C. 154(b) by 1138 days.

(21) Appl. No.: 11/904,261

(22) Filed: Sep. 26, 2007

(65) Prior Publication Data
US 2008/0111433 A1 May 15, 2008

Related U.S. Application Data

(60) Provisional application No. 60/848,173, filed on Sep. 28, 2006.

(51) Int. Cl.
*F04B 39/06* (2006.01)
*H02K 9/00* (2006.01)
(52) U.S. Cl. ............... 417/368; 310/59; 310/62
(58) Field of Classification Search .......... 310/58, 310/59, 62, 63, 52–54; 417/366, 368
See application file for complete search history.

(56) References Cited

U.S. PATENT DOCUMENTS

| 5,714,816 | A | 2/1998 | Jensen | |
|---|---|---|---|---|
| 6,246,134 | B1 * | 6/2001 | Berrong et al. | 310/52 |
| 6,359,351 | B1 * | 3/2002 | Semba et al. | 310/52 |
| 6,499,532 | B1 * | 12/2002 | Williams | 165/47 |
| 6,750,573 | B1 * | 6/2004 | Schmidt et al. | 310/59 |
| 7,118,355 | B2 | 10/2006 | Lipa | |
| 7,244,110 | B2 | 7/2007 | Hong | |
| 7,345,385 | B2 * | 3/2008 | Kreitzer | 310/59 |
| 2005/0151430 | A1 * | 7/2005 | Lowther | 310/58 |
| 2006/0055256 | A1 | 3/2006 | Kreitzer | |

FOREIGN PATENT DOCUMENTS

| EP | 697761 | | 2/1996 |
|---|---|---|---|
| FR | 2864367 | | 6/2005 |
| JP | 62085654 | * | 4/1987 |
| JP | 09201007 | * | 7/1997 |
| JP | 2001008410 | * | 1/2001 |
| WO | WO 0105017 A1 | | 1/2001 |

* cited by examiner

*Primary Examiner* — Charles Freay

(57) ABSTRACT

Certain exemplary embodiments can comprise a system, which can comprise an electric motor cooling fan. The electric motor cooling fan can be driven by an auxiliary motor distinct from an electric motor adapted to be cooled by the electric motor cooling fan. The system can comprise a motor enclosure of the electric motor. The motor enclosure can be configured in a predetermined ventilation pattern.

17 Claims, 17 Drawing Sheets

B – B

DEVICES AND/OR SYSTEMS FOR MOUNTING AN AUXILIARY BLOWER

CROSS-REFERENCES TO RELATED APPLICATIONS

This application claims priority to, and incorporates by reference herein in its entirety, pending U.S. Provisional Patent Application Ser. No. 60/848,173 filed 28 Sep. 2006.

BACKGROUND

In certain electric motors, internal cooling air can be circulated via a fan that is mounted to a main motor shaft, which can rotate at the same angular velocity as the motor itself. Various air baffles can be provided to guide the air to desired portions of the electric motor. In certain variable speed motors, an amount of heat dissipated at low speeds can be greater than the flow capability of the fan. Because a total amount of airflow through a fan dramatically decreases with rotational speed, a cooling system that acts independently of the motor speed can be utilized. An independently driven auxiliary blower can provide a constant airflow regardless of the motor speed.

Numerous types of air enclosure assemblies can be associated with electric motors. Certain enclosure assemblies are associated with distinct cooling air flow patterns. Various cooling methods might be used to optimize the cooling at various speeds. Certain enclosures might not be provided with auxiliary blowers, and an auxiliary blower might be added later to the existing enclosure as an afterthought. As a result, different blowers might be used for certain distinct enclosure types, and a blower motor and fan might be ducted to the machine in a relatively complex manner.

SUMMARY

Certain exemplary embodiments comprise a system, which can comprise an electric motor cooling fan. The electric motor cooling fan can be driven by an auxiliary motor that is distinct from an electric motor adapted to be cooled by the electric motor cooling fan. The system can comprise a motor enclosure of the electric motor. The motor enclosure can be configured in a predetermined ventilation pattern.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
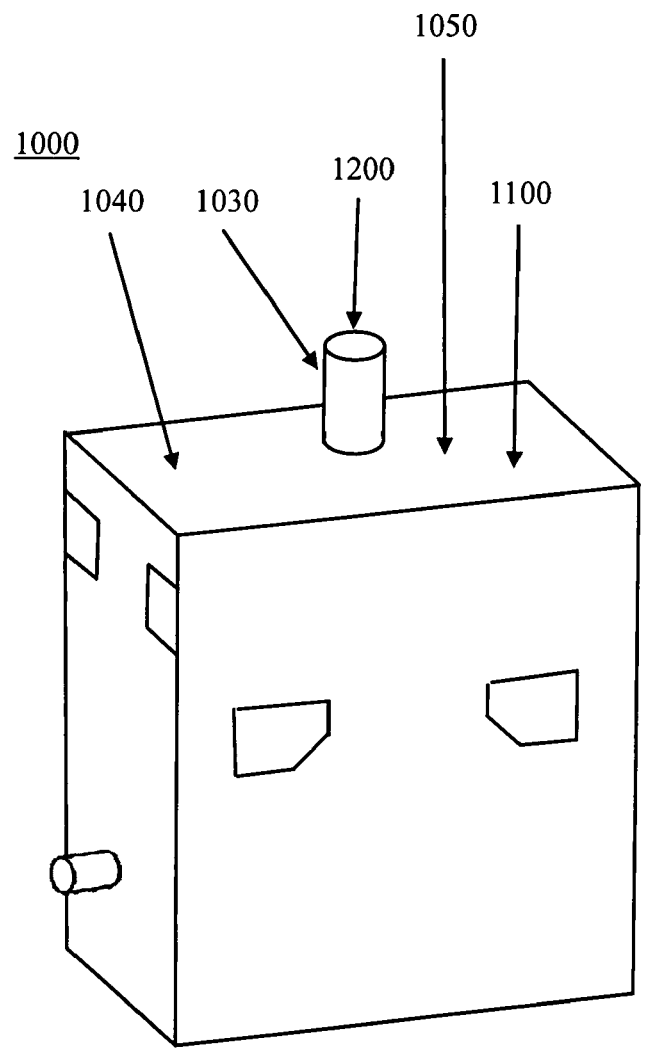
FIG. 1 is a perspective view of an exemplary embodiment of an electric motor system 1000.

Certain exemplary embodiments provide a system, which can comprise an electric motor cooling fan. The electric motor cooling fan can be driven by an auxiliary motor distinct from an electric motor adapted to be cooled by the electric motor cooling fan. The system can comprise a motor enclosure of the electric motor. The motor enclosure can be configured in a predetermined ventilation pattern.

Certain exemplary embodiments provide a family of motor enclosures of electric motors designed such that one electric motor cooling fan unit can be adapted for use on each of a plurality of enclosure types. The plurality of motor enclosure types can comprise: Weather Protected type II (WPII) with double end to center ventilation (X ventilation), WPII with end to end ventilation (Z ventilation), Totally Enclosed Air-Air Cooled (TEAAC) with double end to center ventilation (X ventilation), TEAAC with end to end ventilation (Z ventilation), totally enclosed water to air cooled) TEWAC with double end to center ventilation (X ventilation), and TEWAC with end to end ventilation (Z ventilation). The electric motor cooling fan can be designed with one or more of the following design features:

- can be adapted to bolt directly to the motor enclosure assembly without additionally duct work;
- an auxiliary motor adapted to drive the electric motor cooling fan can be outside of the enclosure of the electric motor for ease of maintaining the auxiliary motor (e.g., regreasing auxiliary motor bearings, vibration and temperature measurements, electrical wiring, etc.); and/or
- electric motor cooling fan units can be mounted in the horizontal or vertical orientation so the same electric motor cooling fan can be used for a horizontal or vertical machine, etc.

Certain exemplary embodiments can reduce material and/or inventory costs compared to electric motor configurations that do not utilize a standard blower assembly. Certain exemplary embodiments can comprise design and/or fabrication of a system that comprises an electric motor, an electric motor cooling fan driven by a dedicated auxiliary motor, air deflection baffles internal to an enclosure of the primary motor, and a mount to mechanically couple the primary motor to the electric motor cooling fan. The primary motor's enclosure can be selected from the group of WPII, Totally Enclosed Air-Air Cooled (TEAAC), totally enclosed water to air-cooled) TEWAC. Any of the WPII, TEAAC, and TEWAC enclosures can have either a double end-to-center ventilation (X ventilation) or end-to-end ventilation (Z ventilation). A common blower mount is used to mount the electric motor cooling fan to any of the WPII, TEAAC, and TEWAC enclosures using either X ventilation or Z ventilation. Internal baffles within the primary motor can be adapted to channel air moved by the electric motor cooling fan according to either X ventilation or Z ventilation. The electric motor cooling fan mount can comprise a plate that releasably attaches to the primary motor and releasably attaches to the electric motor cooling fan.

FIG. 1 is a perspective view of an exemplary embodiment of an electric motor system 1000, which can comprise an electric motor 1100. Electric motor 1100 can be a WPII motor that is configured to be cooled via air circulating in an X ventilation pattern. Heat generated by operation of electric motor 1100 can be transferred from internal components via cooling air, which can be circulated by an electric motor cooling fan 1200. Electric motor cooling fan 1200 can be driven by an auxiliary motor 1030 that is distinct from electric motor 1100. Electric motor 1100 can be adapted to be cooled by electric motor cooling fan 1200. As illustrated, electric motor cooling fan 1200 can be mounted to a top surface of electric motor 1100.

A motor enclosure 1040 of electric motor 1100 can be configured in a ventilation pattern selected from a plurality of ventilation patterns comprising an X ventilation pattern and a Z ventilation pattern. Motor enclosure 1040 can be adapted to be operatively cooled by electric motor cooling fan 1200. Electric motor cooling fan 1200 can be directly and operatively couplable, via a releasably attachable mounting flange (such as flange 13300 of FIG. 13), to an exterior housing 1050 of motor enclosure 1040. Motor enclosure 1040 can be selected from a group of enclosures comprising a Weather Protected type II (WPII) enclosure, Totally Enclosed Air-Air Cooled (TEAAC) enclosure, and Totally Enclosed Water to Air-Cooled (TEWAC) enclosure. Electric motor cooling fan 1200 can be adapted to be operatively coupled to and/or operatively cool motor enclosure 1040.

Figure 2:
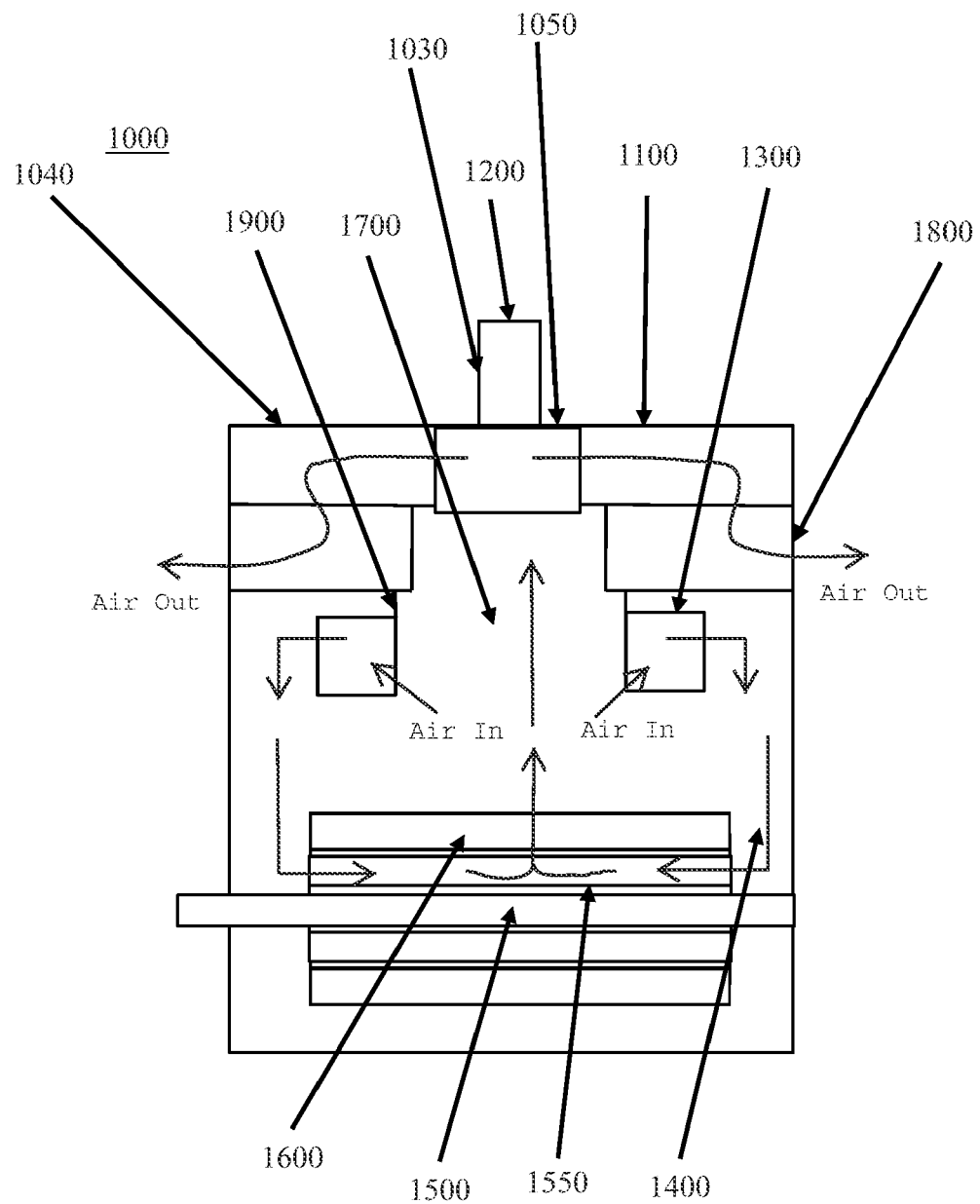
FIG. 2 is a cut-away view of an exemplary embodiment of the electric motor system 1000 of FIG. 1.

FIG. 2 is a cut-away view of an exemplary embodiment of the electric motor system 1000 of FIG. 1, which can comprise electric motor 1100 and electric motor cooling fan 1200. Electric motor 1100 can define one or more air inlets 1300, via which an intake of cooling air can be obtained. Cooling air flowing through air inlets 1300 can be channeled to end areas 1400 of a rotor 1500. The cooling air can be channeled from areas of rotor 1500 to an air channel 1700 via a plurality openings defined by bars of a stator 1600. Cooling air can receive a motive force from electric motor cooling fan 1200 and can exit electric motor 1100 via one or more defined exhaust ports 1800. Electric motor 1100 can utilize an X ventilation pattern that comprises a set of baffles 1900 that can be adapted to channel cooling air from electric motor cooling fan 1200 to enter a rotor portion 1500 of electric motor 1100 on each end of rotor 1500. Set of baffles 1900 of the X ventilation pattern, defined by enclosure 1040, can be adapted to channel the cooling air to exit rotor 1500 via a plurality of openings defined by a circumferential face 1550 of rotor 1500.

Figure 3:
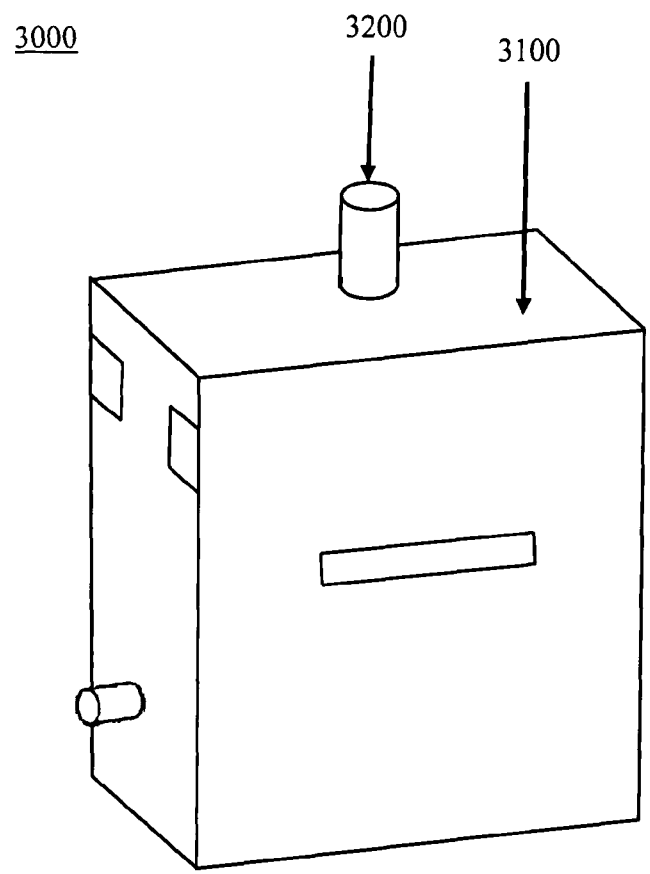
FIG. 3 is a perspective view of an exemplary embodiment of an electric motor system 3000.

FIG. 3 is a perspective view of an exemplary embodiment of an electric motor system 3000, which can comprise an electric motor 3100. Electric motor 3100 can be a WPII motor that is configured to be cooled via air circulating in a Z ventilation pattern. Heat generated by operation of electric motor 3100 can be transferred from internal components via cooling air, which can be circulated by an electric motor cooling fan 3200. As illustrated, electric motor cooling fan 3200 can be mounted to a top surface of electric motor 3100.

Figure 4:
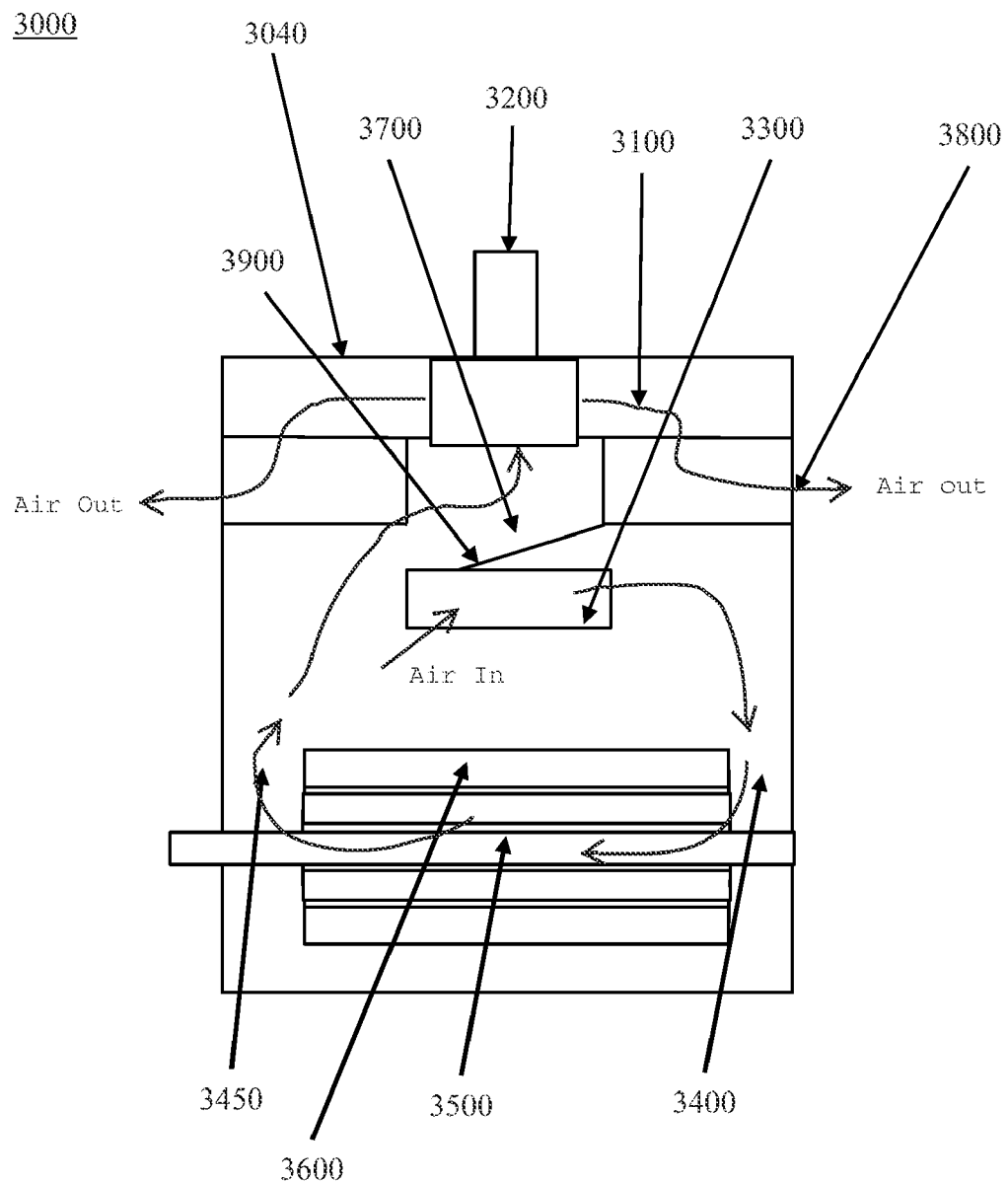
FIG. 4 is a cut-away view of an exemplary embodiment of the electric motor system 3000 of FIG. 3.

FIG. 4 is a cut-away view of an exemplary embodiment of the electric motor system 3000 of FIG. 3, which can comprise electric motor 3100 and electric motor cooling fan 3200. Electric motor 3100 can define one or more air inlets 3300, via which an intake of cooling air can be obtained. Cooling air flowing through an air inlet 3300 can be channeled to a first end area 3400 of a rotor 3500.

The cooling air can be channeled from first end area 3400 at least partially via openings associated with rotor 3500 and a plurality openings defined by bars of a stator 3600 to a second end area 3450. Cooling air can be channeled to electric motor cooling fan 3200 via an air channel 3700. Cooling air can receive a motive force from electric motor cooling fan 3200 and can exit electric motor 3100 via one or more defined exhaust ports 3800. Electric motor 3100 can utilize a Z ventilation pattern that comprises a set of baffles 3900 that can be adapted to channel cooling air from electric motor cooling fan 3200 to enter a rotor portion 3500 of electric motor 3100 at a first end 3400 of rotor 3500. Set of baffles 3900 of the Z ventilation pattern, defined by enclosure 3040, can be adapted to channel the cooling air to exit rotor 3500 via a plurality of openings defined by a circumferential face 3550 of rotor 3500.

Figure 5:
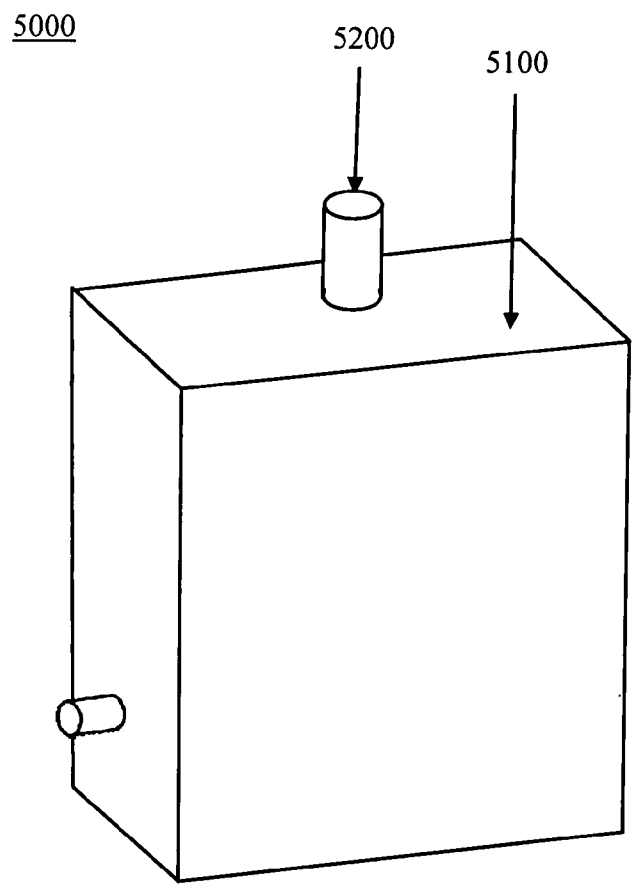
FIG. 5 is a perspective view of an exemplary embodiment of an electric motor system 5000.

FIG. 5 is a perspective view of an exemplary embodiment of an electric motor 5000, which can comprise an electric motor 5100. Electric motor 5100 can be a TEWAC motor that is configured to be cooled via air circulating in an X ventilation pattern. Heat generated by operation of electric motor 5100 can be transferred from internal components via cooling air, which can be circulated by an electric motor cooling fan 5200. As illustrated, electric motor cooling fan 5200 can be mounted to a top surface of electric motor 5100.

Figure 6:
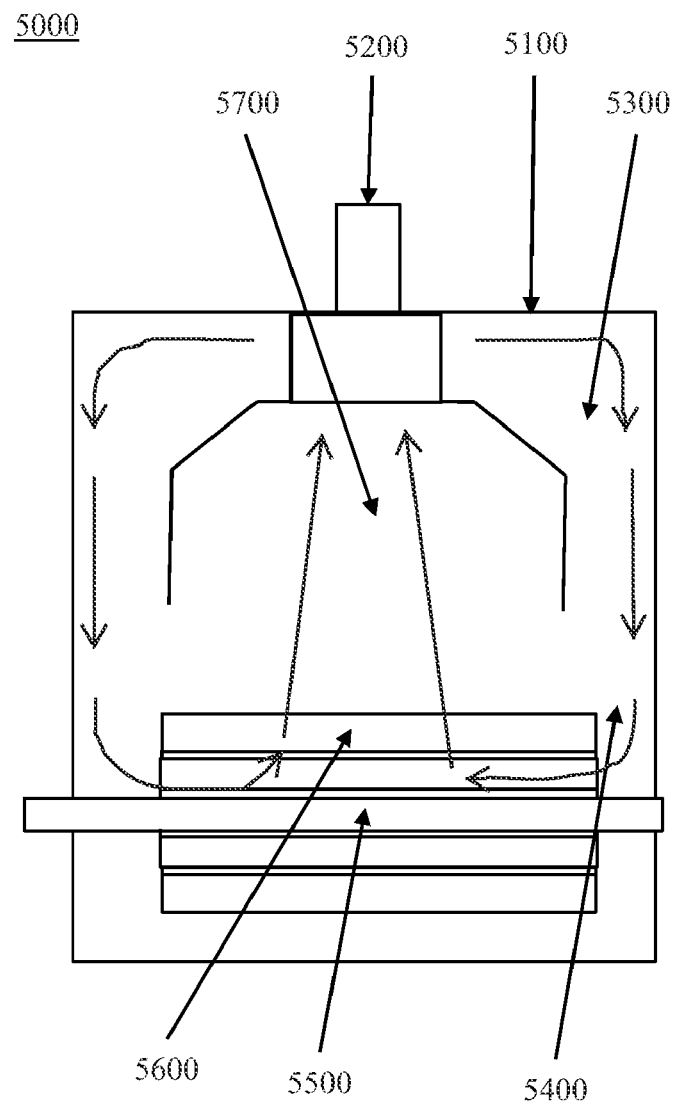
FIG. 6 is a cut-away view of an exemplary embodiment of the electric motor system 5000 of FIG. 5.

FIG. 6 is a cut-away view of an exemplary embodiment of the electric motor system 5000 of FIG. 5, which can comprise electric motor 5100 and electric motor cooling fan 5200. Electric motor 5100 can be substantially totally enclosed in that cooling air is recirculated within electric motor 5100 with little air exiting or entering electric motor 5100. Cooling air flowing within electric motor 5100 can be channeled via electric motor cooling fan 5200 to air entry areas 5300 of electric motor 5100 and subsequently to end areas 5400 of a rotor 5500. The cooling air can be channeled from areas of rotor 5500 to an air channel 5700 via a plurality openings defined by bars of a stator 5600. Cooling air can receive a motive force from electric motor cooling fan 5200. The cooling air can be recirculated to air entry areas 5300.

Figure 16:
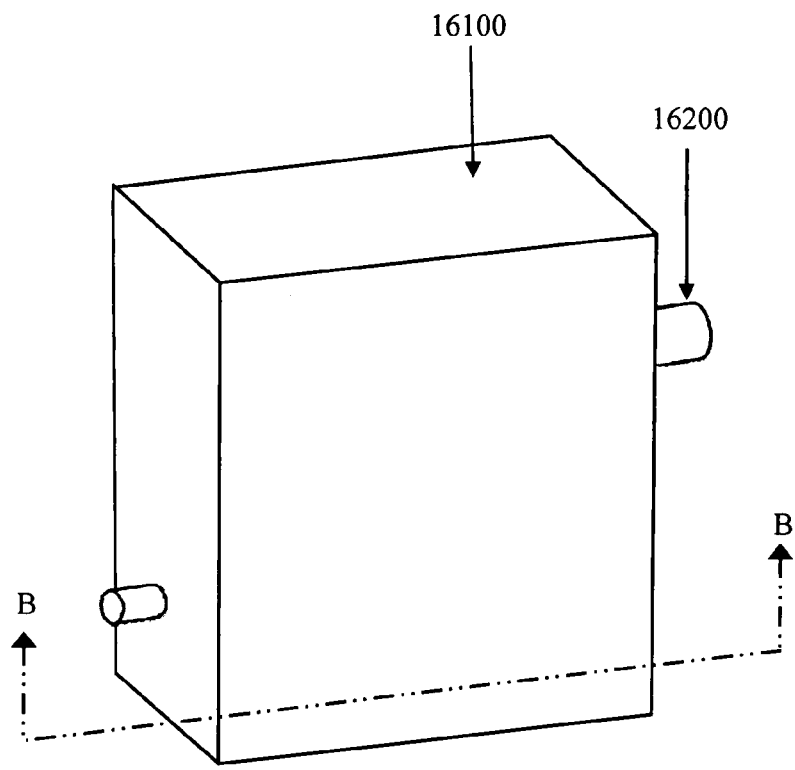
FIG. 16 is a perspective view of an exemplary embodiment of an electric motor system 16000.

FIG. 16 is a perspective view of an exemplary embodiment of an electric motor 16000, which can comprise an electric motor 16100. Electric motor 16100 can be a TEWAC motor that is configured to be cooled via air circulating in a Z ventilation pattern. Heat generated by operation of electric motor 16100 can be transferred from internal components via cooling air, which can be circulated by an electric motor cooling fan 16200. As illustrated, electric motor cooling fan 16200 can be mounted to a side surface of electric motor 16100.

Figure 7:
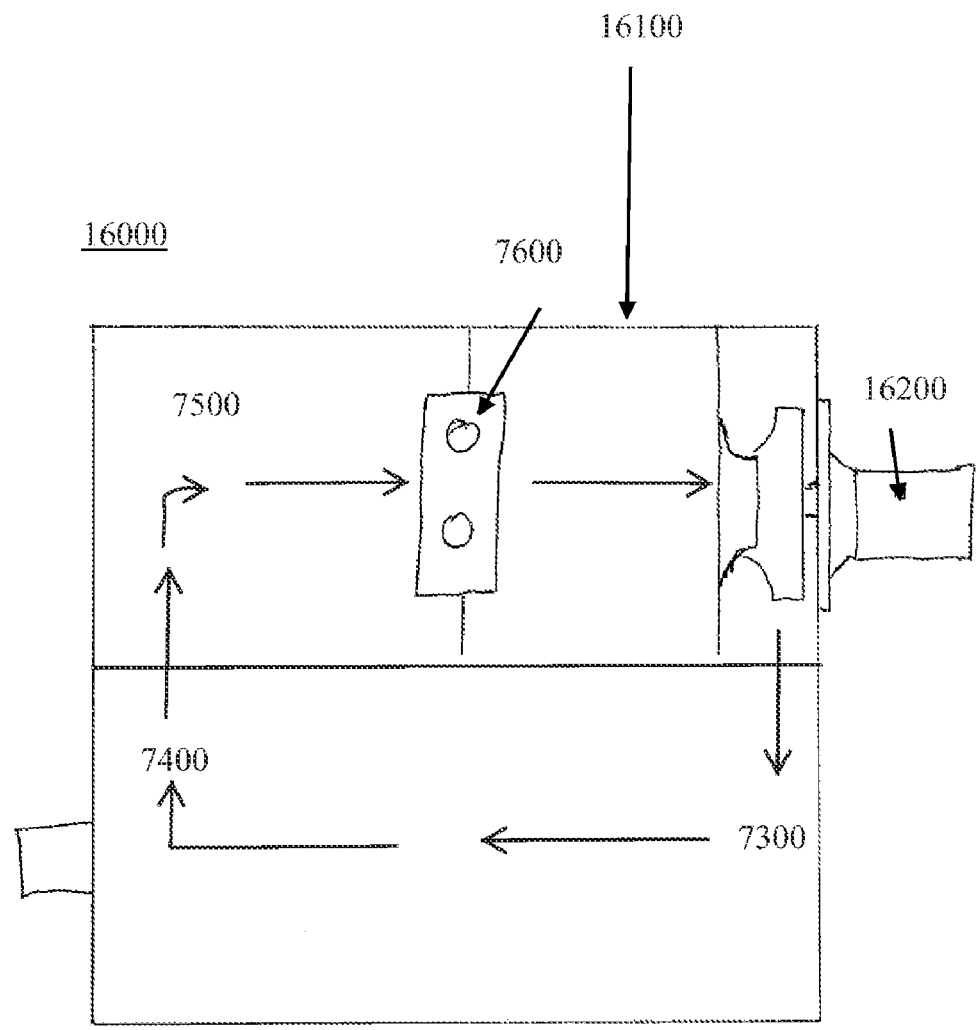
FIG. 7 is a sectional diagram of an exemplary embodiment of the electric motor system 16000 of FIG. 16.

FIG. 7 is a sectional diagram of an exemplary embodiment of an electric motor 16000 of FIG. 16, which can comprise an electric motor 16100. Electric motor 16100 can be a TEWAC motor that can be configured to be cooled via air circulating in a Z ventilation pattern. Heat generated by operation of electric motor 16100 can be transferred from internal components via cooling air, which can be circulated by an electric motor cooling fan 16200. As illustrated, electric motor cooling fan 16200 can be mounted to a side surface of electric motor 16100.

A motive force can be provided to the cooling air by electric motor cooling fan 16200. The cooling air can be channeled to a first end 7300 of a heat generating portion of electric motor 16100. The heat generating portion of electric motor 16100 can comprise a rotor and a stator. The cooling air can be channeled via portions of the rotor and the stator to a second end 7400 and to a cooling chamber 7500 of electric motor 16100. Cooling chamber 7500 can comprise a water cooler 7600, which can be adapted to cool the cooling air and transfer heat therefrom to cooling water circulated through water cooler 7600. Air exiting water cooler 7600 can be channeled back to electric motor cooling fan 16200 to be recirculated.

Figure 17:
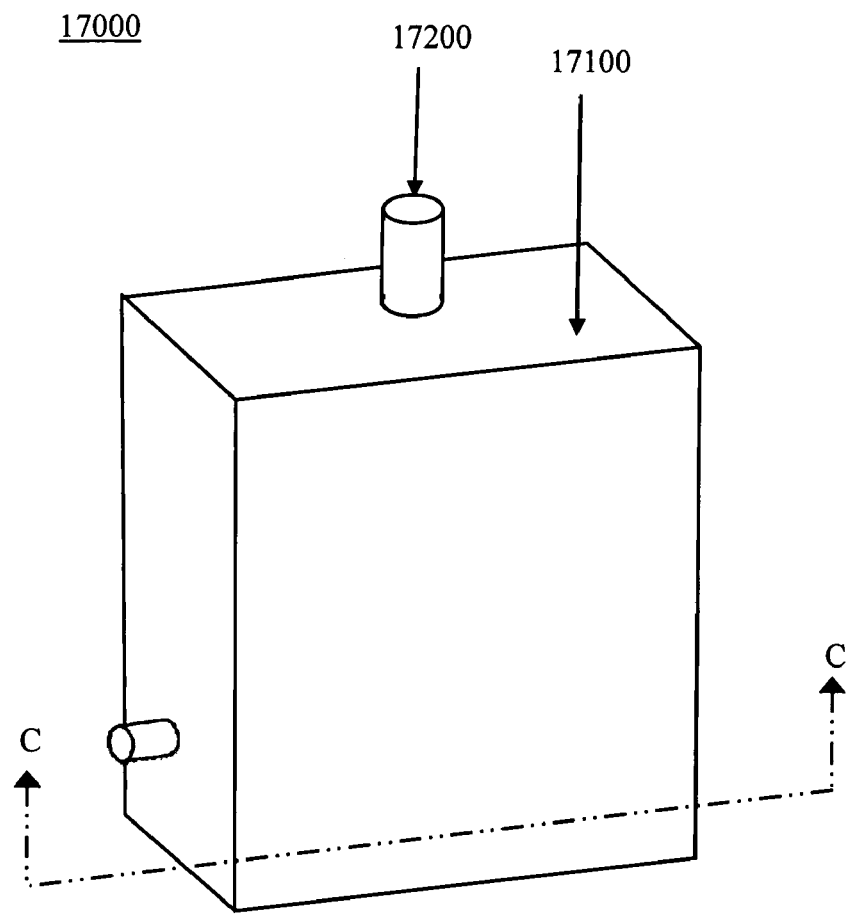
FIG. 17 is a perspective view of an exemplary embodiment of an electric motor system 17000.

FIG. 17 is a perspective view of an exemplary embodiment of an electric motor 17000, which can comprise an electric motor 17100. Electric motor 17100 can be a TEAAC motor that is configured to be cooled via air circulating in an X ventilation pattern. Heat generated by operation of electric motor 17100 can be transferred from internal components via cooling air, which can be circulated by an electric motor cooling fan 17200. As illustrated, electric motor cooling fan 17200 can be mounted to a top surface of electric motor 17100.

Figure 8:
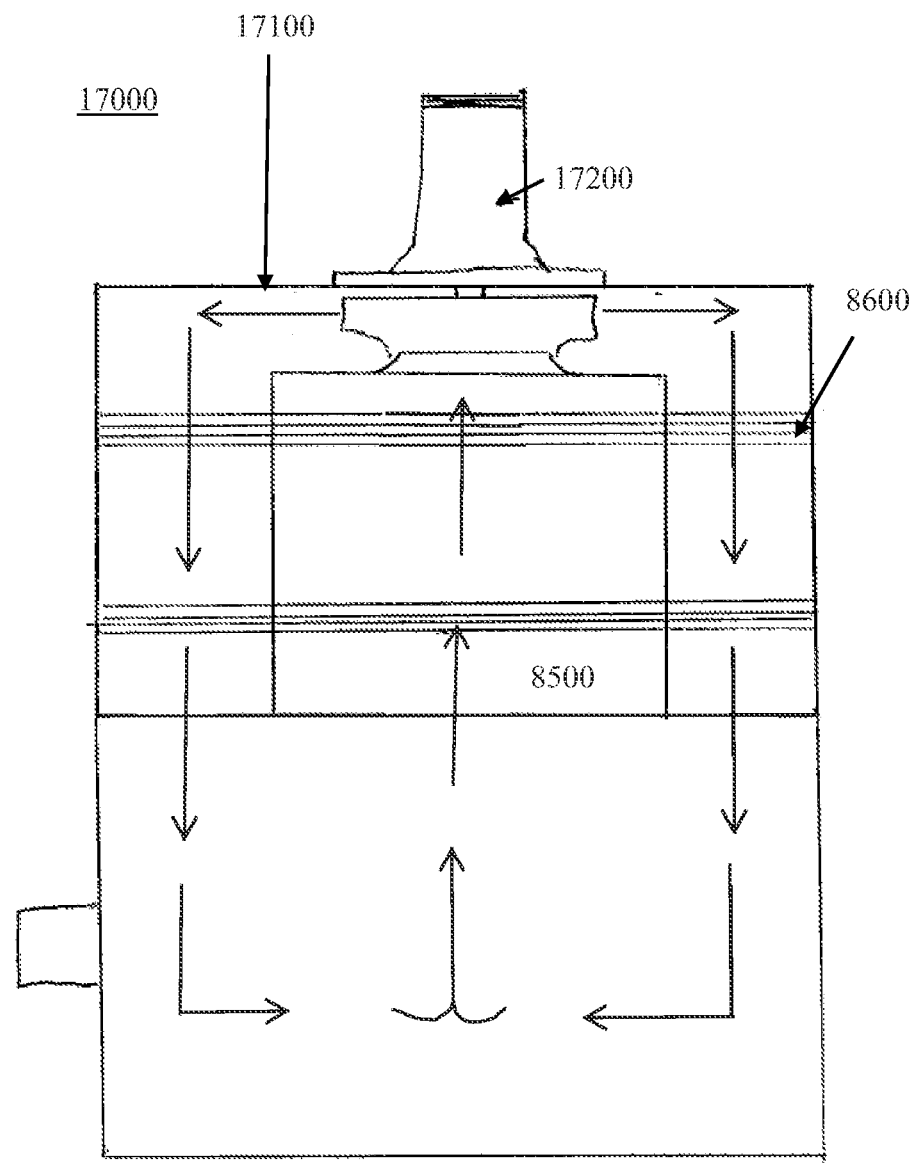
FIG. 8 is a sectional diagram of an exemplary embodiment of the electric motor system 17000 of FIG. 17.

FIG. 8 is a sectional diagram of an exemplary embodiment of the electric motor system 17000 of FIG. 17, which can comprise an electric motor 17100. Electric motor 17100 can be a TEAAC motor that is configured to be cooled via air circulating in an X ventilation pattern. Heat generated by operation of electric motor 17100 can be transferred from internal components via cooling air, which can be circulated by an electric motor cooling fan 17200. As illustrated, electric motor cooling fan 17200 can be mounted to a top surface of electric motor 17100.

A motive force can be provided to the cooling air by electric motor cooling fan 17200. The cooling air can be channeled to each of two ends of an air circulation chamber 8300. The cooling air can transfer heat to indirect cooling air via an air-air heat exchanger 8600. The cooling air can be channeled to two ends 8400 of a heat generating portion of electric motor 17100. The heat generating portion of electric motor 17100 can comprise a rotor and a stator. The cooling air can be channeled via portions of the rotor and the stator to a cooling chamber inlet 8500 of electric motor 17100. Heated air entering cooling chamber inlet 8500 can transfer heat via air-air heat exchanger 8600 and can be cooled thereby. Air exiting cooling chamber inlet 8500 can be channeled back to electric motor cooling fan 17200 to be recirculated.

Figure 9:
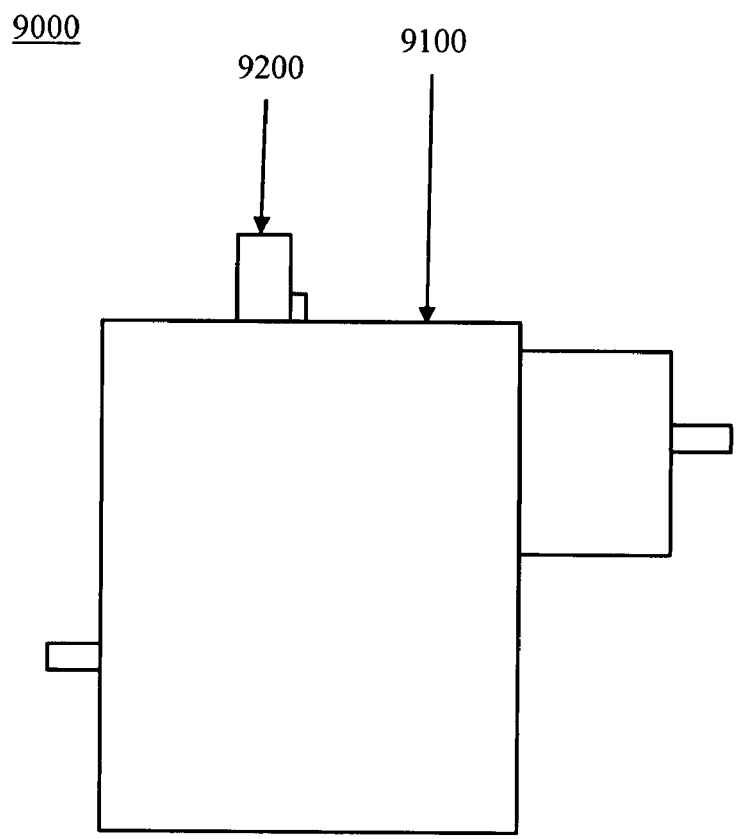
FIG. 9 is a view of an exemplary embodiment of an electric motor 9000.

FIG. 9 is a side view of an exemplary embodiment of an electric motor 9000, which can comprise an electric motor 9100. Electric motor 9100 can be a TEAAC motor that is configured to be cooled via air circulating in a Z ventilation pattern. Heat generated by operation of electric motor 9100 can be transferred from internal components via cooling air, which can be circulated by an electric motor cooling fan 9200. As illustrated, electric motor cooling fan 9200 can be mounted to a top surface of electric motor 9100.

Figure 10:
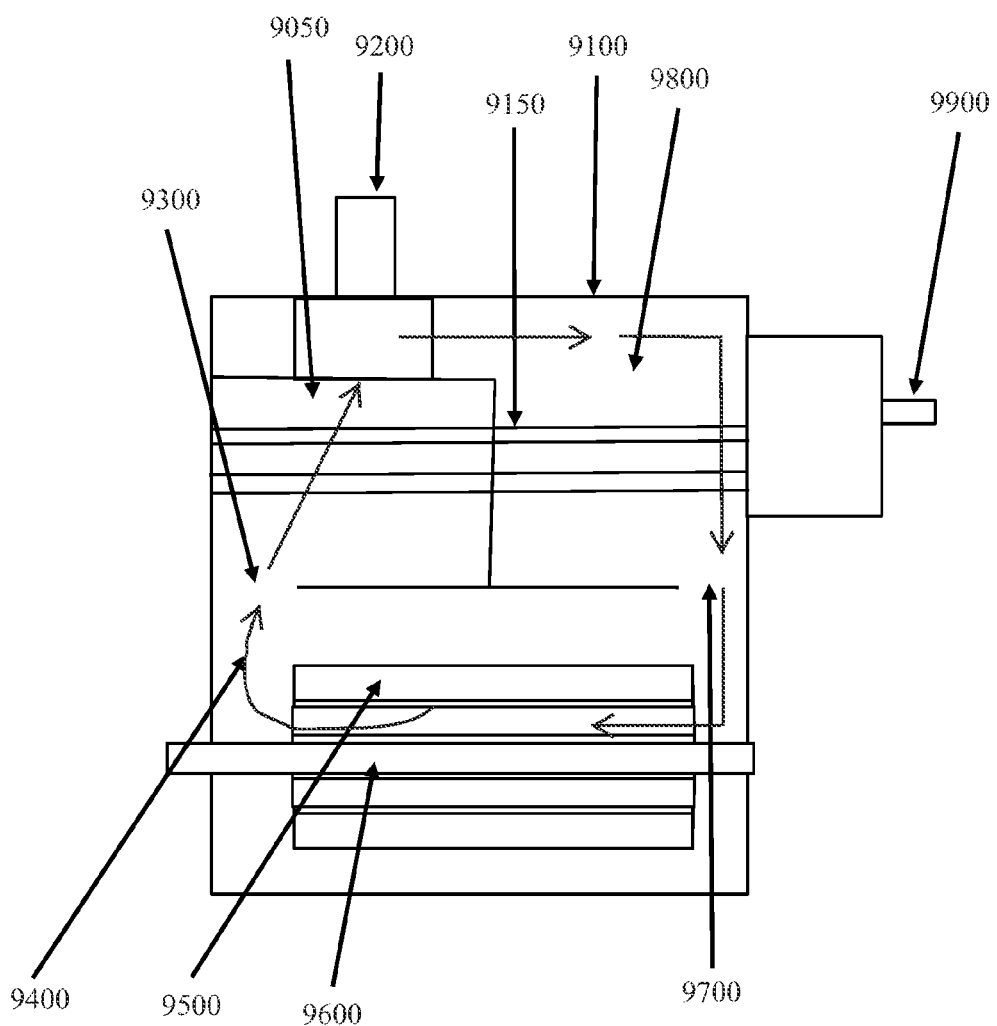
FIG. 10 is a cut-away view of an exemplary embodiment of the electric motor 9000 of FIG. 9.

FIG. 10 is a cut-away view of an exemplary embodiment of the electric motor 9000 of FIG. 9, which can comprise electric motor 9100 and electric motor cooling fan 9200. Electric motor 9100 can be substantially totally enclosed in that cooling air is recirculated within electric motor 9100 with little air exiting or entering electric motor 9100. Cooling air flowing within electric motor 9100 can be channeled via electric motor cooling fan 9200 to an air entry area 9300 of a cooling chamber 9050 of electric motor 9100. Cooling chamber 9050 can comprise an air-to-air heat exchanger 9150, which can utilize indirect cooling air conveyed to air-to-air heat exchanger 9150 via an indirect cooling air fan 9900. Cooling air can enter a heat generating portion of electric motor 9100 via an inlet end 9400. The cooling air can be channeled via portions of a rotor 9600 and/or a stator 9500 to an outlet end 9700 of the heat generating portion of electric motor 9100. Cooling air can be channeled, via a motive force provided by electric motor cooling fan 9200, to an air exhaust area 9800 of cooling chamber 9050. Heat can be transferred from the cooling air to the indirect cooling air via air-to-air heat exchanger 9150. Cooled cooling air can then be returned to electric motor cooling fan 9200 for recirculation.

Figure 11:
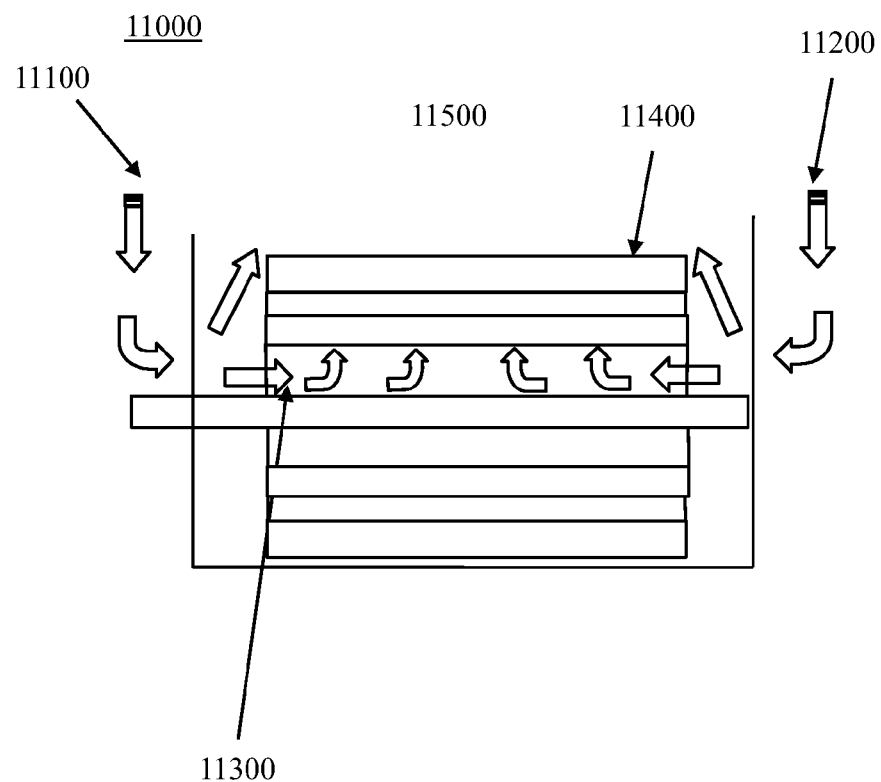
FIG. 11 is a sectional diagram of an exemplary embodiment of an electric motor system 11000.

FIG. 11 is a sectional diagram of an exemplary embodiment of an electric motor 11000, which can be illustrative of an X ventilation pattern. Cooling air can be impelled by an electric motor cooling fan to enter electric motor 11000 via a first end 11100 and a second end 11200 of electric motor 11000. The cooling air can be channeled to flow along at least a portion of a rotor 11300 and can be channeled therefrom to a plurality of gaps defined by a plurality of bars of a stator 11400 of electric motor 11000. Cooling air can exit stator 11400 and can enter an air chamber 11500, which can be an inlet chamber to the electric motor cooling fan.

Figure 12:
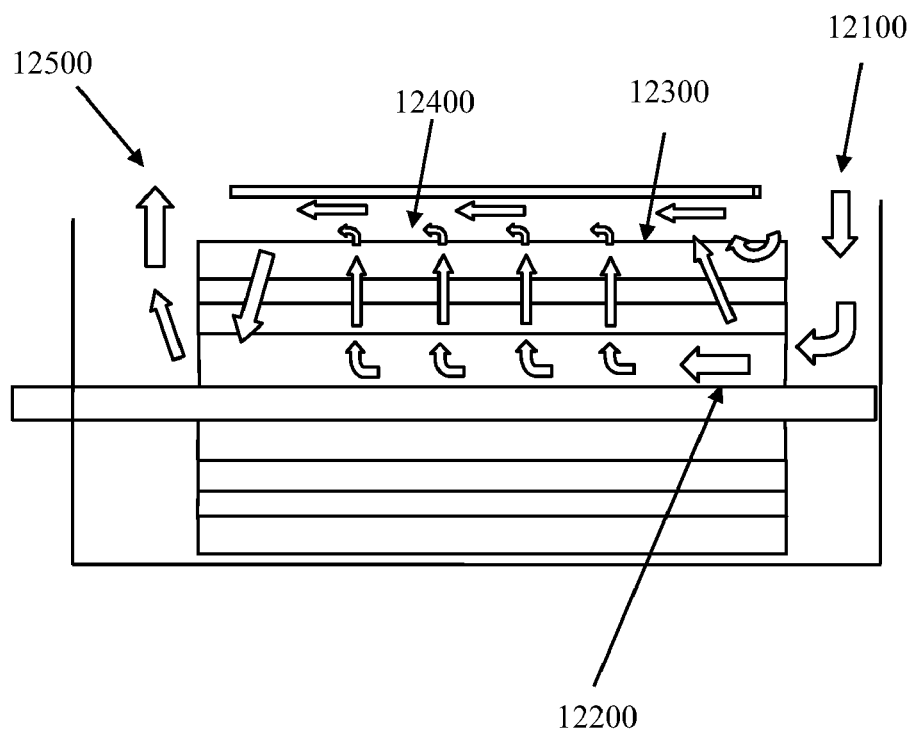
FIG. 12 is a sectional diagram of an exemplary embodiment of an electric motor system 12000.

FIG. 12 is a sectional diagram of an exemplary embodiment of an electric motor 12000, which can be illustrative of a Z ventilation pattern. Cooling air can be impelled by an electric motor cooling fan to enter electric motor 12000 via a first end 12100. The cooling air can be channeled to flow along at least a portion of a rotor 12200 and can be channeled therefrom to a plurality of gaps defined by a plurality of bars of a stator 12300 of electric motor 12000. Cooling air can exit stator 11400 and can enter an air chamber 12400, which can channel the cooling air to a second end 12500 of electric motor 12000. Cooling air can be channeled from second end 12500 via an air inlet chamber to the electric motor cooling fan.

Figure 13:
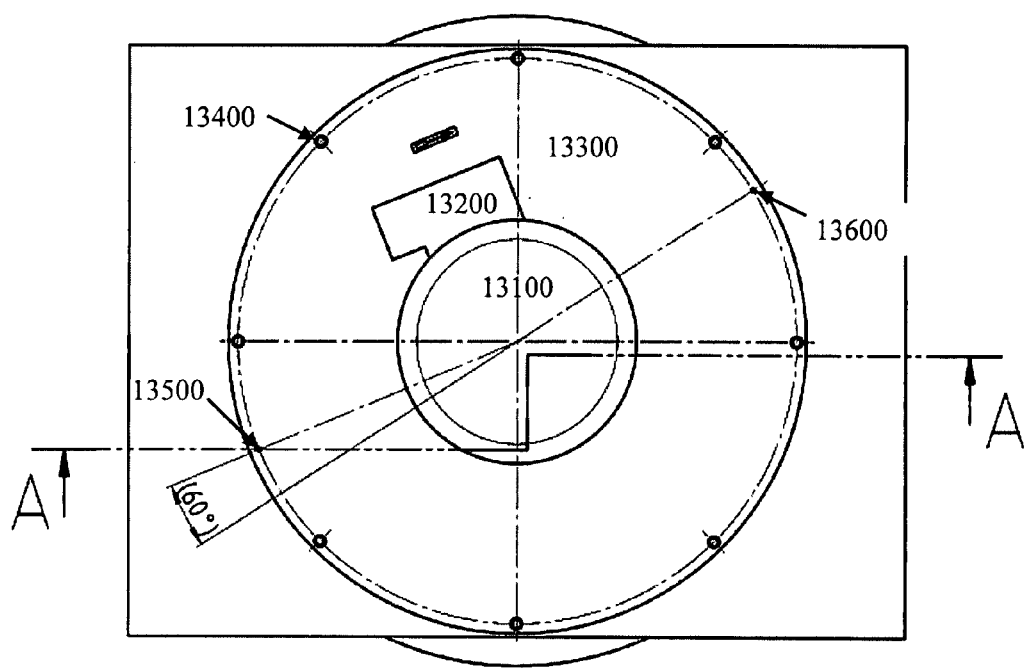
FIG. 13 is a plan view of an exemplary embodiment of an auxiliary blower 13000.

FIG. 13 is a plan view of an exemplary embodiment of an electric motor cooling fan 13000, which can comprise an auxiliary motor 13100. Auxiliary motor 13100 can be electrically coupled to a source of electrical energy via a junction box 13200. Electric motor cooling fan 13000 can be operatively attached to an electric motor via a flange 13300. Flange 1300 can define a plurality of apertures 13400, 13500, and 13600, which can be adapted to receive fasteners to operatively attach flange 13000 to a corresponding set of fastener apertures defined by a housing of the electric motor.

Figure 14:
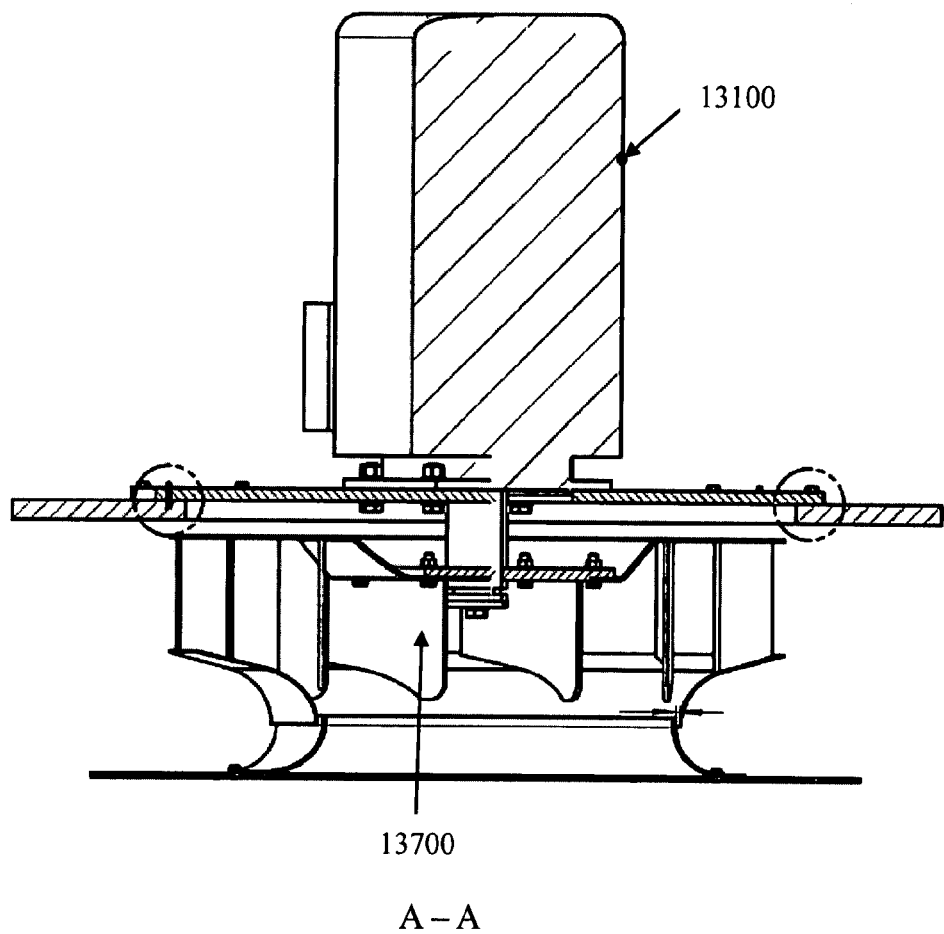
FIG. 14 is a sectional view of an exemplary embodiment of an auxiliary blower 13000 taken along section line A-A of FIG. 13.

FIG. 14 is a sectional view of an exemplary embodiment of an auxiliary blower 13000 taken along section line A-A of FIG. 13, which can comprise auxiliary motor 13100 and a fan 13700.

Figure 15:
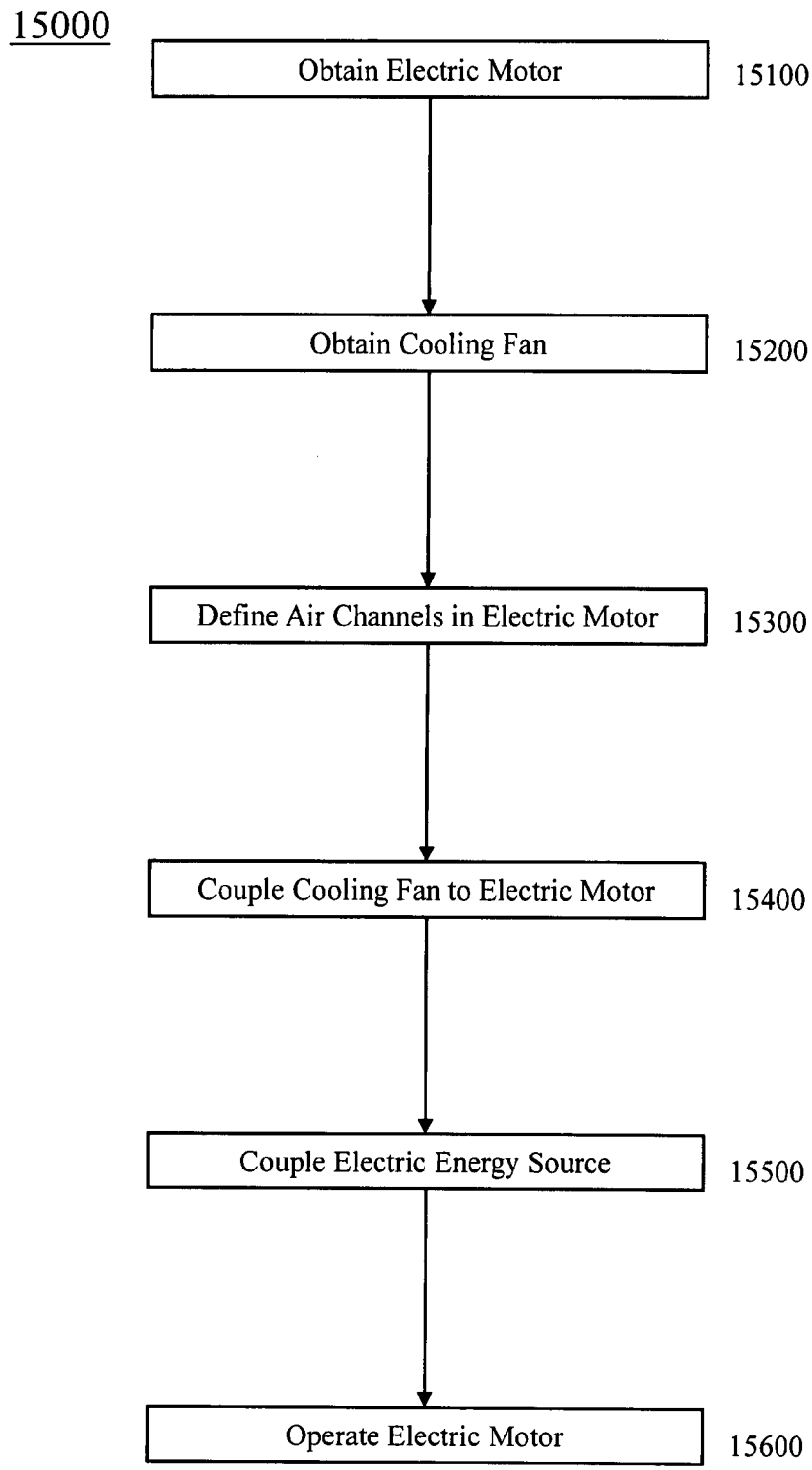
FIG. 15 is a flowchart of an exemplary embodiment of a method 15000.

FIG. 15 is a flowchart of an exemplary embodiment of a method 15000. At activity 15100, an electric motor can be obtained. The electric motor can have a motor enclosure selected from a group of enclosures comprising a Weather Protected type II (WPII) enclosure, Totally Enclosed Air-Air Cooled (TEAAC) enclosure, and/or Totally Enclosed Water to Air-Cooled (TEWAC) enclosure.

At activity 15200, an electric motor cooling fan can be obtained. The electric motor cooling fan adapted to operatively cool an electric motor selected from the group of motor enclosures. The motor enclosure can be adapted to be operatively cooled by the electric motor cooling fan. The electric motor cooling fan can be directly and operatively couplable, via a releasably attachable mounting flange, to an exterior housing of the motor enclosure. The electric motor cooling fan can be driven by an auxiliary motor that is distinct from the electric motor.

At activity 15300, air channels can be defined in the electric motor. The motor enclosure can be configured in a ventilation pattern selected from a plurality of ventilation patterns comprising an X ventilation pattern and a Z ventilation pattern. In certain exemplary embodiments, a set of baffles can be installed and/or modified to determine the ventilation pattern.

The X ventilation pattern can comprise a set of baffles adapted to channel cooling air from the electric motor cooling fan to enter a rotor of the electric motor on each end of the rotor. The set of baffles of the X ventilation pattern can be adapted to channel the cooling air to exit the rotor via a plurality of openings defined by a circumferential face of the rotor.

The Z ventilation pattern can comprise a set of baffles adapted to channel cooling air from the electric motor cooling fan to enter the rotor of the electric motor at a first end of the rotor. The set of baffles of the Z ventilation pattern can be adapted to channel the cooling air, via a plurality of openings defined by a circumferential face of the rotor, to exit the rotor via a second end of the rotor.

At activity 15400, the cooling fan can be operatively coupled to a motor enclosure the electric motor. The cooling fan can be operatively coupled via a flange connection utilizing a plurality of fasteners, such as threaded fasteners.

At activity 15500, a source of electrical energy can be coupled to the electric motor and/or an auxiliary motor of the electric motor cooling fan. The source of electrical energy can be coupled to the electric motor cooling fan via a separate and distinct junction box from that of the electric motor.

At activity 15600, the electric motor can be operated. The electric motor can be coupled to a load and operated at a fixed or variable rotational speed. The electric motor cooling fan can circulate cooling air within the electric motor to allow the electric motor to operate without overheating.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

- a—at least one.
- activity—an action, act, deed, function, step, and/or process and/or a portion thereof.
- adapted to—suitable, fit, and/or capable of performing a specified function.
- air—the earth's atmospheric gas.
- and/or—either in conjunction with or in alternative to.
- apparatus—an appliance or device for a particular purpose.
- approximately—about and/or nearly the same as.
- associated with—related to.
- at least—not less than.
- attachable—capable of being fastened, secured, coupled, and/or joined.
- auxiliary—an accessory that functions in a subsidiary or supporting capacity relative to a primary function of a device.
- baffle—a usually static, but potentially movable, device that regulates the flow of a fluid.
- can—is capable of, in at least some embodiments.
- channel—(v) to cause to flow via a defined passage, conduit, and/or groove adapted to convey one or more fluids. (n) a passage, conduit, and/or groove adapted to convey one or more fluids.
- circumferential—around a circumference, or periphery, of an object having a circular shape and/or cross-section.
- comprise—to include but not be limited to.
- configure—to make suitable, fit, and/or capable of performing a specified function.
- cool—to make less warm, to remove heat from, and/or to reduce the molecular and/or kinetic energy of.
- cooling—reducing a temperature of a substance.
- couplable—capable of being joined, connected, and/or linked together.
- coupling—(n) a device adapted to join, connect, and/or link. (v) joining, connecting, and/or linking.
- define—to establish the meaning, relationship, outline, form, and/or structure of; and/or to precisely and/or distinctly describe and/or specify.
- device—a machine, manufacture, and/or collection thereof.
- directly—without anything intervening.
- distinct—discrete and/or readily distinguishable from all others.
- drive—(n) the means or apparatus for transmitting motion or power to a machine or from one machine part to another. (v) to supply the motive force or power to and cause and/or force to move and/or function.
- driven by—receiving motive force or power from.
- each—every one of a group considered individually.
- electric motor—a motion-imparting device powered by electricity.
- electric motor cooling fan—a device adapted to move air in a quantity and manner sufficient to cool an electric motor so as to allow operation of the electric motor in accordance with one or more predetermined specifications.
- enclosure—a housing adapted to encase at least portions of an electric motor rotor and/or stator.
- end—an extremity and its vicinity of something that has length; a terminus.
- enter—to come and/or flow into.
- exit—to leave and/or flow out of.
- exterior housing—one or more outside surfaces of an electric motor enclosure that covers, encloses, protects, holds, and/or supports an electric motor.
- face—the most significant or prominent surface of an object.
- from—used to indicate a source.
- group—a plurality of determined units.
- have—to be identified by.
- may—is allowed and/or permitted to, in at least some embodiments.
- method—a process, procedure, and/or collection of related activities for accomplishing something.
- mounting flange—a protruding rim, edge, rib, or collar that is adapted to operatively couple a first device to at least a second device.
- opening—an open space serving as a passage or gap.
- operatively—in a manner able to function and/or to work.
- operatively cooled—controlled in temperature such that an electric motor will, without intervening failures from causes other than temperature, operate at least twelve hours under full load conditions without experiencing a failure substantially caused by an excessive temperature.
- pattern—a characteristic form.
- plurality—the state of being plural and/or more than one.

provide—to furnish, supply, give, convey, send, and/or make available.

receive—to gather, take, acquire, obtain, accept, get, and/or have bestowed upon.

regarding—pertaining to.

releasably—capable of being freed, in a substantially non-destructive manner, from something that binds, fastens, or holds back.

rotor—a rotating portion of a machine.

said—when used in a system or device claim, an article indicating a subsequent claim term that has been previously introduced.

selected—a chosen item.

set—a related plurality of predetermined elements; and/or one or more distinct items and/or entities having a specific common property or properties.

substantially—to a considerable, large, and/or great, but not necessarily whole and/or entire, extent and/or degree.

system—a collection of mechanisms, devices, data, and/or instructions, the collection designed to perform one or more specific functions.

temperature—measure of the average kinetic energy of the molecules in a sample of matter, expressed in terms of units or degrees designated on a standard scale.

Totally Enclosed Air-Air Cooled (TEAAC) enclosure—a housing adapted to resist air flow between environments outside of the housing and inside the housing, the housing adapted to be cooled by circulating internal air through a heat exchanger which, in turn, is cooled by circulating external air. The housing is provided with an air-to-air heat exchanger, integral or machine mounted, for cooling internal air. The housing is provided with one or more fans, integral with a rotor shaft or separate, adapted to circulate the internal air. The housing is provided with one or more fans, integral with the rotor shaft or separate, but external to the enclosing part or parts, adapted to circulate the external air. The housing defined by NEMA MG1 1.26.8.

Totally Enclosed Water to Air-Cooled (TEWAC) enclosure—a housing adapted to be resist air flow from the environment outside of the housing and the inside the housing, the housing adapted to be cooled by circulating air which, in turn, is cooled by circulating water. The housing is provided with a water-cooled heat exchanger, integral or machine mounted, that is adapted to cool the internal air and one or more fans, integral with the rotor shaft or separate, adapted to circulate the internal air. The housing defined by NEMA MG1 1.26.7.

type—a number of things having in common traits or characteristics that distinguish them as a group or class.

utilize—to use and/or put into service.

ventilation—a flow of air.

via—by way of and/or utilizing.

Weather Protected type II (WPII) enclosure—a guarded housing with ventilating passages constructed so as to resist an entrance of rain, snow, and/or air-borne particles to the electric parts. Ventilating passages at both intake and discharge of the housing are so arranged that high-velocity air and air borne particles blown into the housing by storms and/or high winds can be discharged without entering internal ventilating passages that lead directly to the electric parts of the housing. The normal path of ventilating air, which enters the electric parts of the machine, is arranged by baffling or separate housings so as to provide at least three abrupt changes in direction, none of which is less than 90 degrees. In addition, an area of low velocity not exceeding 600 feet per minute is provided in an intake air path to resist a possibility of moisture or dirt being carried into electric parts within the housing. The housing defined by NEMA MG1 1.25.8.

wherein—in regard to which; and; and/or in addition to.

X-pattern—a predetermined arrangement adapted to channel cooling air, the predetermined arrangement comprising a set of baffles adapted to channel the cooling air from an electric motor cooling fan to enter a rotor of the electric motor on each end of the rotor, the set of baffles adapted to channel the cooling air to exit the rotor via a plurality of openings defined by a circumferential face of the rotor.

Z-pattern—a predetermined arrangement adapted to channel cooling air, the predetermined arrangement comprising a set of baffles adapted to channel the cooling air from the electric motor cooling fan to enter the rotor of the electric motor at a first end of the rotor, the set of baffles adapted to channel the cooling air, via the plurality of openings defined by a circumferential face of the rotor, to exit the via a second end of the rotor.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, every portion (e.g., title, field, background, summary, abstract, drawing figure, etc.) of this application, other than the claims themselves, is to be regarded as illustrative in nature, and not as restrictive.

What is claimed is:

1. A motor cooling system comprising:
   an electric motor, with a housing having therein:
   a rotor having first and second axial ends, the rotor defining axial ventilation pathways from its first end to its second end;
   a stator having first and second axial ends, the stator defining radial air ventilation pathways exhausting about a stator circumference; and
   a baffle radially spaced apart from the stator and defining with at least a portion of the stator circumference an air chamber extending axially from the first to the second stator end;
   the motor having an airflow ventilation pattern pathway from the respective first ends to the respective second ends of the rotor and stator defined by the axial and radial air ventilation pathways and the air chamber;
   a motor enclosure enveloping the motor housing and having baffles defined therein for directing airflow from the respective second ends of the rotor and stator proximal a mounting flange coupled to the enclosure;
   an electric motor-powered cooling fan adapted to operatively cool said electric motor, said electric motor-powered cooling fan releasably, directly, and operatively coupled, to the mounting flange to said motor enclosure and in fluid communication with the airflow ventilation pattern pathway, said electric motor-powered fan:
      adapted to circulate cooling air within the airflow ventilation pattern pathway within the housing of said electric motor such that the cooling air directly flows from the first respective ends of the rotor and stator to the second ends thereof, and from the second ends to the motor-powered fan;
      having a fan shaft that defines a longitudinal axis that is substantially non-collinear with a longitudinal axis of a shaft of said rotor of said electric motor; and
      said fan shaft driven by an auxiliary motor distinct from the electric motor.

2. The system of claim 1, wherein, said longitudinal axis of said fan shaft of said electric motor fan, when operatively coupled to said electric motor, is substantially perpendicular to said longitudinal axis of said shaft of said rotor of said electric motor.

3. The system of claim 1, wherein said ventilation pattern is a Z ventilation pattern which comprises said enclosure baffles are adapted to channel cooling air from said electric motor cooling fan to enter said rotor of said selected electric motor at a first end of said rotor, said enclosure baffles of said Z ventilation pattern adapted to channel said cooling air, via a plurality of openings defined by a circumferential face of said rotor, to exit said rotor via a second end of said rotor.

4. The system of claim 1, wherein said motor enclosure is selected from the group consisting of a Weather Protected type II (WPII) enclosure constructed so as to resist an entrance of rain, snow and/or air-borne particles to the motor's electric parts, Totally Enclosed Air-Air Cooled (TEAAC) enclosure constructed with an air-to-air heat exchanger, and a Totally Enclosed Water to Air-Cooled (TEWAC) enclosure constructed with a water-cooled heat exchanger.

5. The system of claim 4, wherein said motor enclosure is said TEEAC enclosure.

6. The system of claim 4, wherein said motor enclosure is said TEWAC enclosure.

7. A motor cooling system comprising:
   an electric motor, with a housing having therein:
   a rotor having first and second axial ends, the rotor defining axial ventilation pathways from its first end to its second end;
   a stator having first and second axial ends, the stator defining radial air ventilation pathways exhausting about a stator circumference; and
   a baffle radially spaced apart from the stator and defining with at least a portion of the stator circumference an air chamber extending axially from the first to the second stator end;
   the motor having an airflow ventilation pattern pathway from the respective first ends to the respective second ends of the rotor and stator defined by the axial and radial air ventilation pathways and the air chamber;
   a motor enclosure enveloping the motor housing;
   an electric motor-powered cooling fan coupled to said motor enclosure, adapted to operatively cool said electric motor, said electric motor-powered fan:
      adapted to circulate cooling air within the airflow ventilation pattern pathway within the housing of said electric motor such that the cooling air directly flows from the first respective ends of the rotor and stator to the second ends thereof;
      having a fan shaft that defines a longitudinal axis that is substantially non-collinear with a longitudinal axis of a shaft of said rotor of said electric motor; and
      said fan shaft driven by an auxiliary motor distinct from the electric motor; and
   a second baffle structure oriented within the enclosure and in fluid communication with the airflow ventilation pattern pathway for directing cooling air from the second ends of the rotor and stator to said electric motor cooling fan.

8. The system of claim 7, wherein, said longitudinal axis of said fan shaft of said electric motor fan, when operatively coupled to said electric motor, is substantially perpendicular to said longitudinal axis of said shaft of said rotor of said electric motor.

9. The system of claim 7, wherein said motor enclosure is selected from the group consisting of a Weather Protected type II (WPII) enclosure constructed so as to resist an entrance of rain, snow and/or air-borne particles to the motor's electric parts, a Totally Enclosed Air-Air Cooled (TEAAC) enclosure constructed with an air-to-air heat exchanger, and a Totally Enclosed Water to Air-Cooled (TEWAC) enclosure constructed with a water-cooled heat exchanger.

10. The system of claim 9, wherein said motor enclosure is said TEAAC enclosure.

11. The system of claim 9, wherein said motor enclosure is said TEWAC enclosure.

12. In a motor cooling system having:
   an electric motor, with a housing having therein:
   a rotor having first and second axial ends, the rotor defining axial ventilation pathways from its first end to its second end;
   a stator having first and second axial ends and radial air ventilation pathways exhausting about a stator circumference; and a baffle radially spaced apart from the stator and defining with at least a portion of the stator circumference an air chamber extending axially from the first to the second stator end;

the motor having an airflow ventilation pattern pathway from the respective first ends to the respective second ends of the rotor and stator defined by the axial and radial air ventilation pathways and the air chamber;

a motor enclosure enveloping the motor housing, having an auxiliary aperture formed therein; and a second baffle structure oriented within the enclosure and in fluid communication with the airflow ventilation pattern pathway for directing cooling air from the second ends of the rotor and stator to the auxiliary aperture;

said system further comprising an electric motor cooling fan adapted to be operatively coupled in fluid communication with the motor enclosure auxiliary aperture via a releasably attachable mounting flange that is coupled to said motor enclosure, and when so operatively coupled to said enclosure and said electric motor, said electric motor fan:

adapted to circulate cooling air within the airflow ventilation pattern pathway within the housing of said electric motor such that the cooling air directly flows from the first respective ends of the rotor and stator to the second ends thereof and in turn from the second ends thereof to the electric motor cooling fan;

having a fan shaft that defines a longitudinal axis that is substantially non-collinear with a longitudinal axis of the shaft of said rotor of said electric motor; and said fan shaft driven by an auxiliary motor distinct from the electric motor.

13. The system of claim 12, wherein, said longitudinal axis of said fan shaft of said electric motor fan, when operatively coupled to said electric motor, is substantially perpendicular to said longitudinal axis of said shaft of said rotor of said electric motor.

14. The system of claim 12, wherein said ventilation pattern is a Z ventilation pattern which comprises said second baffle structure is adapted to channel cooling air from said electric motor cooling fan to enter said rotor of said electric motor at a first end of said rotor, said second baffle structure of said Z ventilation pattern adapted to channel said cooling air, via a plurality of openings defined by a circumferential face of said rotor, to exit said rotor via a second end of said rotor.

15. The system of claim 12, wherein said motor enclosure is selected from the group consisting of a Weather Protected type II (WPII) enclosure constructed so as to resist an entrance of rain, snow and/or air-borne particles to the motor's electric parts, a Totally Enclosed Air-Air Cooled (TEAAC) enclosure constructed with an air-to-air heat exchanger, and a Totally Enclosed Water to Air-Cooled (TEWAC) enclosure constructed with a water-cooled heat exchanger.

16. The system of claim 15, wherein said motor enclosure is said TEAAC enclosure.

17. The system of claim 15, wherein said motor enclosure is said TEWAC enclosure.

* * * * *